(12) United States Patent
Milford

(10) Patent No.: US 11,252,455 B2
(45) Date of Patent: Feb. 15, 2022

(54) MULTICHANNEL VIDEO PROGRAMMING DISTRIBUTOR STREAM CONTROLLER

(71) Applicant: ARRIS Enterprises LLC, Suwanee, GA (US)

(72) Inventor: Matthew A. Milford, Waxhaw, NC (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/396,636

(22) Filed: Apr. 27, 2019

(65) Prior Publication Data

US 2019/0342588 A1 Nov. 7, 2019

Related U.S. Application Data

(60) Provisional application No. 62/666,651, filed on May 3, 2018.

(51) Int. Cl.
| | |
|---|---|
| *H04N 21/2381* | (2011.01) |
| *H04N 21/2668* | (2011.01) |
| *H04N 21/234* | (2011.01) |
| *H04N 21/2187* | (2011.01) |
| *H04N 21/235* | (2011.01) |

(52) U.S. Cl.
CPC ..... *H04N 21/2381* (2013.01); *H04N 21/2187* (2013.01); *H04N 21/2355* (2013.01); *H04N 21/23412* (2013.01); *H04N 21/2668* (2013.01)

(58) Field of Classification Search
CPC ..... H04N 21/234212; H04N 21/23424; H04N 21/2668; H04N 21/235; H04N 21/812; H04N 21/2187; H04N 21/25891; H04N 21/2381; H04N 21/2665; H04N 21/4334; H04N 21/26258
See application file for complete search history.

(56) References Cited

U.S. PATENT DOCUMENTS

| | | | | |
|---|---|---|---|---|
| 2009/0254657 | A1* | 10/2009 | Melnyk | H04N 21/6583 709/224 |
| 2015/0381690 | A1* | 12/2015 | Schmidt | H04N 21/2343 709/231 |
| 2017/0171610 | A1* | 6/2017 | Nair | H04N 21/23476 |

* cited by examiner

*Primary Examiner* — Marsha D Banks Harold
*Assistant Examiner* — Dharmesh J Patel
(74) *Attorney, Agent, or Firm* — Chernoff, Vilhauer, McClung & Stenzel, LLP

(57) ABSTRACT

A multichannel video programming distributor controller is provided for use with an adaptive bitrate stream provider, a HTML code repository and a plurality of conversion engines. The multichannel video programming distributor controller includes an outbound IP address inventory system, conversion engine and network elements inventory system, and an MVPD stream controller. The MVPD stream controller is operable to provide a stream instruction, based on one of a plurality of outbound IP addresses, one of a plurality of ABR identification data and HTML identification data so as to instruct one of the plurality of conversion engines to output a first MPEG transport stream.

20 Claims, 5 Drawing Sheets

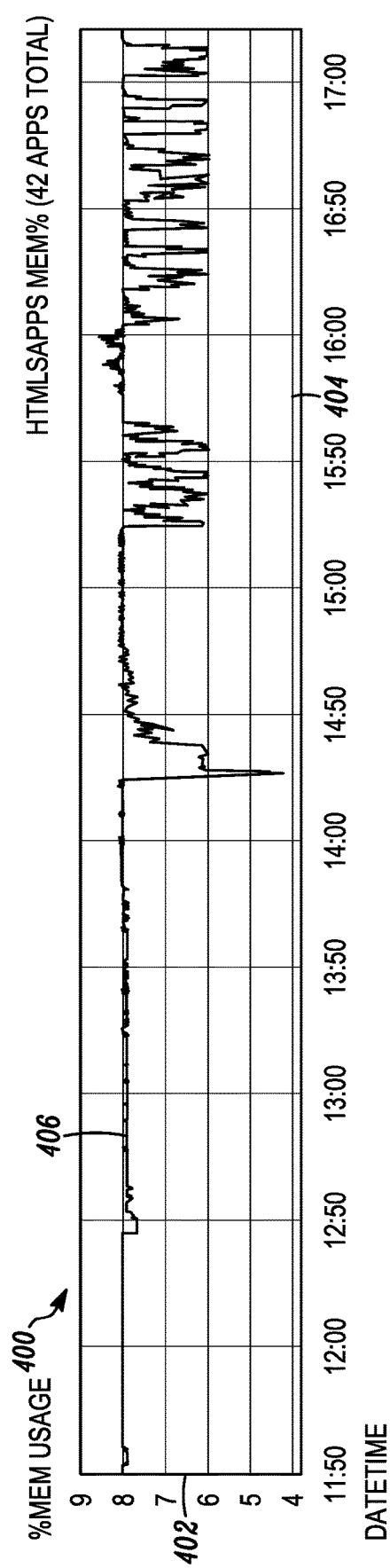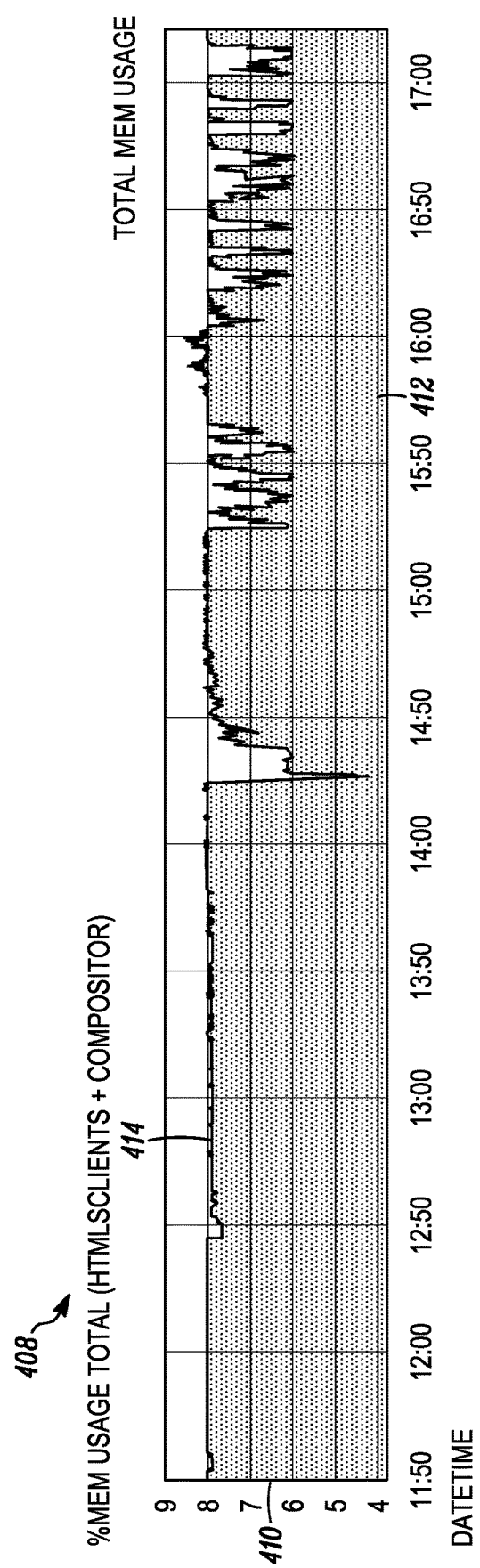
FIG. 4A
FIG. 4B

MULTICHANNEL VIDEO PROGRAMMING DISTRIBUTOR STREAM CONTROLLER

The present application claims priority from U.S. Provisional Application No. 62/666,651 filed May 3, 2018, the entire disclosures of which is incorporated herein by reference.

BACKGROUND

Embodiments of the invention relate to adaptive bitrate (ABR) linear stream to Motion Picture Experts Group (MPEG) transport stream (TS) conversion systems.

SUMMARY

Aspects of the present invention are drawn to a multichannel video programming distributor controller for use with an adaptive bitrate stream provider, a hypertext markup language (HTML) code repository and a plurality of conversion engines. The adaptive bitrate stream provider is operable to provide a plurality of adaptive bitrate streams of content data. The HTML code repository is operable to provide HTML code. Each of the plurality of conversion engines is operable to obtain a respective adaptive bitrate stream from the adaptive bitrate stream provider, to obtain a respective set of HTML code from the HTML code repository and output a respective MPEG transport stream. The multichannel video programming distributor controller includes an outbound IP address inventory system, conversion engine and network elements inventory system, and a multichannel video programming distributor (MVPD) stream controller. The outbound IP address inventory system has a plurality of outbound IP addresses stored therein. The conversion engine and network elements inventory system has stored therein, a plurality of ABR identification data associated with the respective plurality of adaptive bitrate streams of content data and HTML identification data associated with the HTML code. The MVPD stream controller is operable to provide a stream instruction, based on one of the plurality of outbound IP addresses, one of the plurality of ABR identification data and the HTML identification data so as to instruct one of the plurality of conversion engines to output a first MPEG transport stream.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 4A illustrates a graph of memory usage of a MVPD converter as a function of time;

FIG. 4B illustrates a graph of percentage of memory usage of a client device as a function of time;

DETAILED DESCRIPTION

A multichannel video programming distributor (MVPD) is a person such as, but not limited to, a cable operator, a multichannel multipoint distribution service, a direct broadcast satellite service, or a television receive-only satellite program distributor, who makes available for purchase, by subscribers or customers, multiple channels of video programming," where a channel is defined as a "signaling path provided by a cable television system." One type of MVPD provides MVPD streams in a Motion Picture Experts Group (MPEG) transport stream (TS) format for decoding by a television or set-top box.

Further, some MVPDs have created MVPD streams from website content, which originates in an adaptive bitrate (ABR) linear stream format as organized using a Hypertext Markup Language (HTML5) into an HTTP live stream (HLS). However, some televisions and set-top boxes are unable to decode an HLS. Accordingly, a conversion engine is used to convert an HLS to an MPEG TS so that it may be viewed by an end user's television or set-top box.

Figure 1:
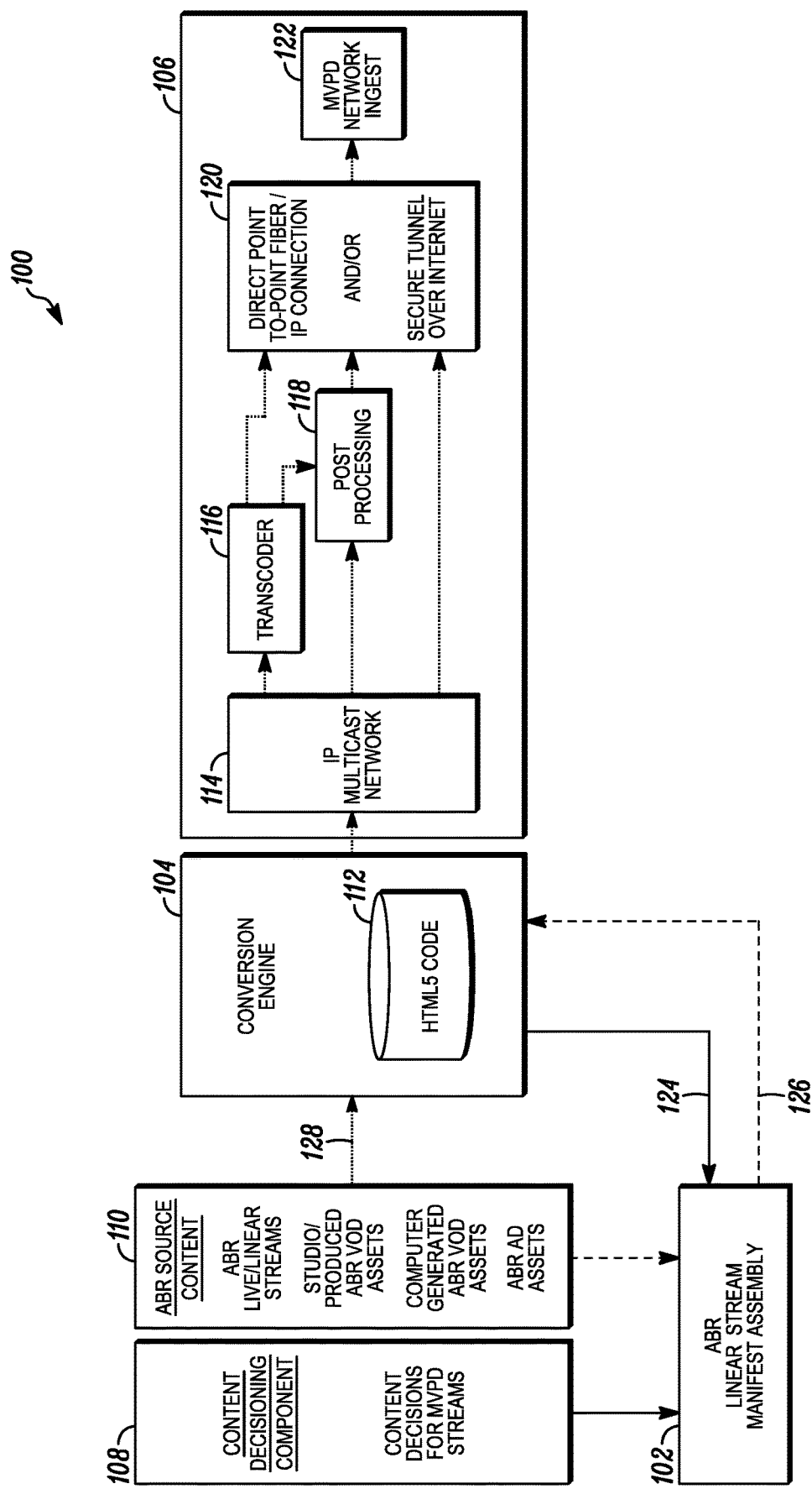
FIG. 1 illustrates prior art system for providing a MVPD stream.

A prior art system and method of providing a MPEG TS from a website originated content HLS will now be described with reference to FIG. 1.

As shown in the figure, a MVPD system 100 includes an ABR stream manifest provider 102, a conversion engine 104, a distribution network 106, a content decisioning component 108 and an ABR source content component 110.

Conversion engine includes an HTML5 code component 112, which includes HTML5 code that enables an ABR stream to be formatted into an HLS.

Distribution network 106 includes an internet protocol (IP) multicast network 114, transcoder 116, a post processing component 118, a network 120 and an MVPD network input component 122.

In operation, conversion engine 104 sends a token 124 to ABR stream manifest provider 102 requesting a manifest for a desired ABR linear stream. For purposes of discussion, let the desired ABR linear stream correspond to a popular sports website.

After receiving token 124, ABR stream manifest provider 102 accesses content decisioning component 108 and ABR source content component 110.

Content decisioning component 108 includes content decisions for MVPD streams. The content decisions determine how the ABR source content is to be arranged. For example, content decisions may instruct the ABR source content to be arranged to include a first video content disposed in a first linear slot, followed by an advertisement content in a second linear slot, which is then followed by a video on demand content in a third linear slot, etc.

ABR source content component 110 includes ABR source content, non-limiting examples of which include ABR live streams, ABR linear streams, studio ABR video on demand (VOD) assets, computer generated ABR VOD assets and ABR advertisement assets.

ABR stream manifest provider 102 accesses content decisioning component 108 and ABR source content component 110.

Token 124 identifies the sought after ABR source content and arrangement defined by the content decisions. ABR stream manifest provider 102 obtains the requested content decisions from content decisioning component 108 and the information of the ABR source content from ABR source content component 110 and assembles an ABR linear stream manifest 126, which indicates the order in which the ABR source content assets should be arranged in the ABR linear stream.

ABR stream manifest provider 102 then provides ABR linear stream manifest 126 to conversion engine 104.

Conversion engine 104 additionally obtains ABR source content 128 from ABR source content component 110, uses HTML5 code from HTML5 code and ABR player code component 112 and assembles an HTTP live stream (HLS) in accordance with ABR linear stream manifest 126.

Finally, conversion engine 104 converts the HLS into and MPEG TS. During the conversion, conversion engine 104 may perform many operations, non-limiting examples of which include decryption, demultiplexing, transcoding and remultiplexing.

The MPEG TS generated by conversion engine 104 is provided to distribution network 106 to ultimately distribute the MPEG TS to an end user's device. In particular, IP multicast network 114 determines whether the MPEG TS should be transcoded or groomed.

If the MPEG TS should be transcoded, IP multicast network 114 provides the MPEG TS to transcoder 116 to be transcoded. For example, transcoder 116 might change the frame rate, resolution and/or the video codec of the MPEG TS.

If the MPEG TS should be groomed, IP multicast network 114 provides the MPEG TS to post processing component 118. For example, post processing component 118 may groom the MPEG TS to improve performance. Such grooming may take the form of Single Program Transport Stream/Multiple Program Transport Stream (SPTS/MPTS) grooming, rate shaping, performing stream redundancy or providing a slate.

With respect to performing stream redundancy, in some cases, conversion engine 104 might generate a plurality of redundant MPEG transport streams. In the event that one stream fails, post processing component 118 might switch to one of the provided redundant streams. In the event all redundant MPEG transport streams fails, post processing component 118 may provide a slate, e.g., a stock video or image to be provided to the end user's television or set to box that indicates that there is a problem, but "We'll Be Right Back."

It should be noted that any transcoded MPEG TS from transcoder 116 will also pass through post processing component 118 for post processing, if needed.

If the MPEG TS from IP multicast network 114 is not needed to be transcoded and/or groomed, IP multicast network 114 sends the MPEG TS to network 120. Otherwise, post processing component 118 sends the processed MPEG TS to network 120. At that point, network 120 may provide the MPEG TS to MVPD network input component 122 for distribution to the end user's device. Network 120 may provide the MPEG TS to MVPD network input component 122 by way of direct point-to-point fiber or IP connection and/or a secure tunnel over the Internet.

MVPD system 100 is limited in its function in that its operation is limited to the specific predetermined ABR source content and the specific predetermined destination of the MVPD network input component 122.

What is needed is an MVPD system that enables controlling, managing and monitoring ABR linear stream-MPEG conversion stream sessions. These streams should to be highly available and the streams should need to be started, stopped, and restarted under operational control or via an application protocol interface (API). The sessions should additionally have configuration settings for things like URLs that target IP Multicast addresses for the outbound MPEG transport streams.

A MVPD stream providing system in accordance with aspects of the present disclosure uses an MVPD stream controller that enables controlling, managing and monitoring ABR linear stream-MPEG conversion stream sessions. The MVPD stream providing system in accordance with aspects of the present disclosure supports start, stop, restart and status operations. It also constantly monitors the streaming sessions and restarts them as needed.

Aspects of the present invention will now be described with reference to FIGS. 2-4D.

Figure 2:
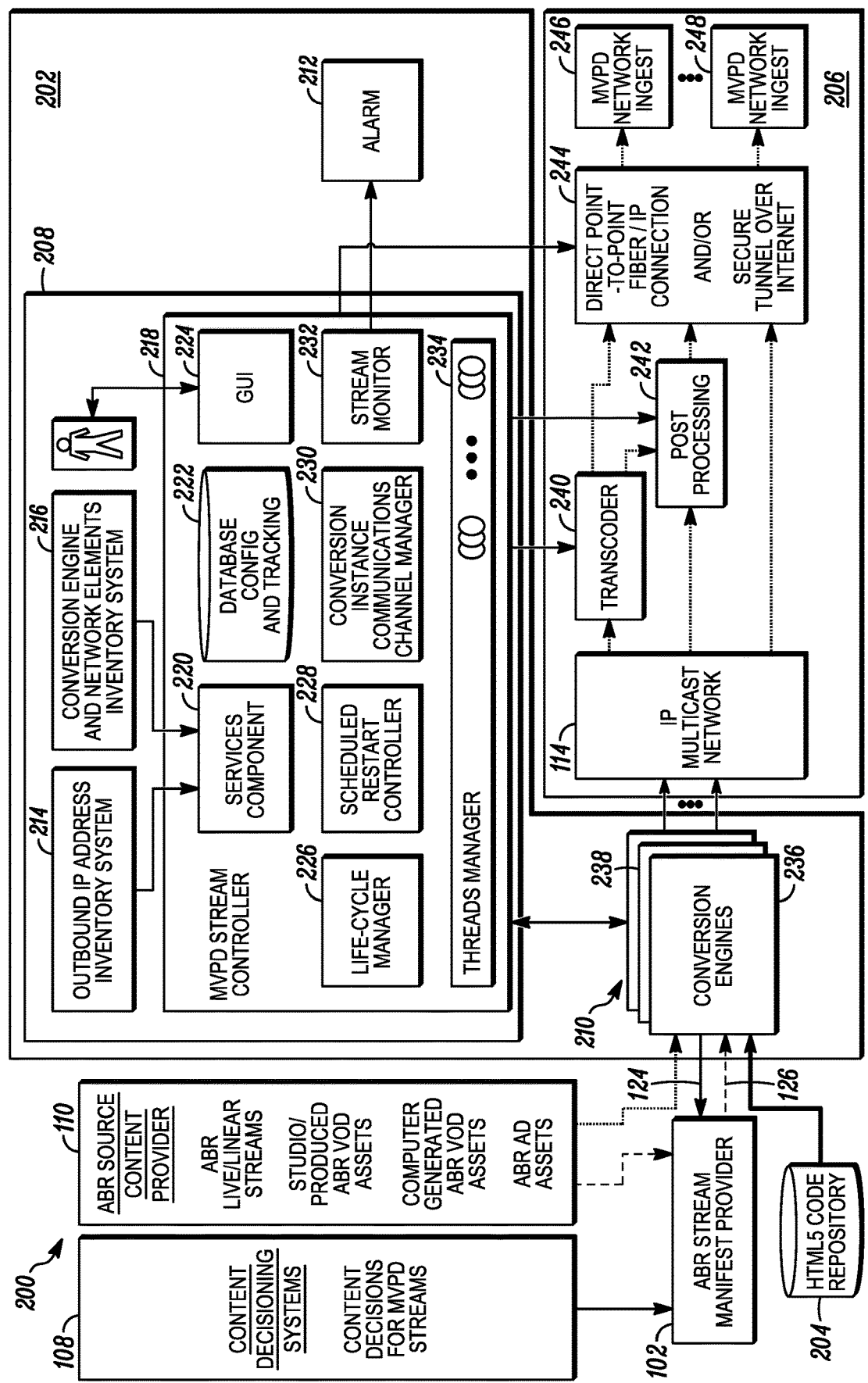
FIG. 2 illustrates an MVPD stream providing system in accordance with aspects of the present disclosure.

FIG. 2 illustrates an MVPD stream providing system 200 in accordance with aspects of the present disclosure.

As shown in the figure, MVPD stream providing system 200 includes ABR stream manifest provider 102, content decisioning component 108, ABR source content component 110, an MVPD controller 202, an HTML5 code repository 204 and a distribution network 206.

In this example, MVPD controller 202 and HTML5 code repository 204 are illustrated as individual devices. However, in some embodiments, MVPD controller 202 and HTML5 code repository 204 may be combined as a unitary device. Further, in some embodiments, at least one of MVPD controller 202 and HTML5 code repository 204 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

MVPD controller 202 includes an MVPD stream controller 208, a plurality of conversion engines 210 and an alarm 212.

In this example, MVPD stream controller 208, the plurality of conversion engines 210 and alarm 212 are illustrated as individual devices. However, in some embodiments, at least two of MVPD stream controller 208, the plurality of conversion engines 210 and alarm 212 may be combined as a unitary device. Further, in some embodiments, at least one of MVPD stream controller 208, the plurality of conversion engines 210 and alarm 212 may be implemented as a computer having tangible computer-readable media for carrying or having computer-executable instructions or data structures stored thereon.

MVPD stream controller 208 includes an outbound IP address inventory system 214, a conversion engine and network elements (CENE) inventory system 216 and an MVPD stream controller component 218.

In this example, outbound IP address inventory system 214, CENE inventory system 216 and MVPD stream controller component 218 are illustrated as individual devices. However, in some embodiments, at least two of outbound IP address inventory system 214, CENE inventory system 216 and MVPD stream controller component 218 may be combined as a unitary device. Further, in some embodiments, at least one of outbound IP address inventory system 214, CENE inventory system 216 and MVPD stream controller component 218 may be implemented as a computer having tangible computer-readable media for carrying or having computer-executable instructions or data structures stored thereon.

MVPD stream controller component 218 includes a services component 220, a database configuration and tracking (DCT) component 222, a graphic user interface (GUI) 224, a life-cycle manager 226, a scheduled restart controller 228, a conversion instance communications channel manager 230, a stream monitor 232 and a thread manager 234.

In this example, services component 220, DCT component 222, GUI 224, life-cycle manager 226, scheduled restart controller 228, conversion instance communications channel manager 230, stream monitor 232 and thread manager 234 are illustrated as individual devices. However, in some embodiments, at least two of services component 220, DCT component 222, GUI 224, life-cycle manager 226, scheduled restart controller 228, conversion instance communications channel manager 230, stream monitor 232 and thread manager 234 may be combined as a unitary device. Further, in some embodiments, at least one of services component 220, DCT component 222, GUI 224, life-cycle manager 226, scheduled restart controller 228, conversion instance communications channel manager 230, stream monitor 232 and thread manager 234 may be implemented as a computer having tangible computer-readable media for carrying or having computer-executable instructions or data structures stored thereon.

A sample of the plurality of conversion engines 210 are indicated as conversion engine 236 and conversion engine 238.

In this example, each of the plurality of conversion engines 210 is illustrated as an individual device. However, in some embodiments, at least two of the plurality of conversion engines 210 may be combined as a unitary device. Further, in some embodiments, at least one of the plurality of conversion engines 210 may be implemented as a computer having tangible computer-readable media for carrying or having computer-executable instructions or data structures stored thereon.

Distribution network 206 includes IP multicast network 114, a transcoder 240, a post processing component 242, a network 244 and a plurality of MVPD network input components, a sample of which are indicated as MVPD network input component 246 and MVPD network input component 248.

Figure 3:
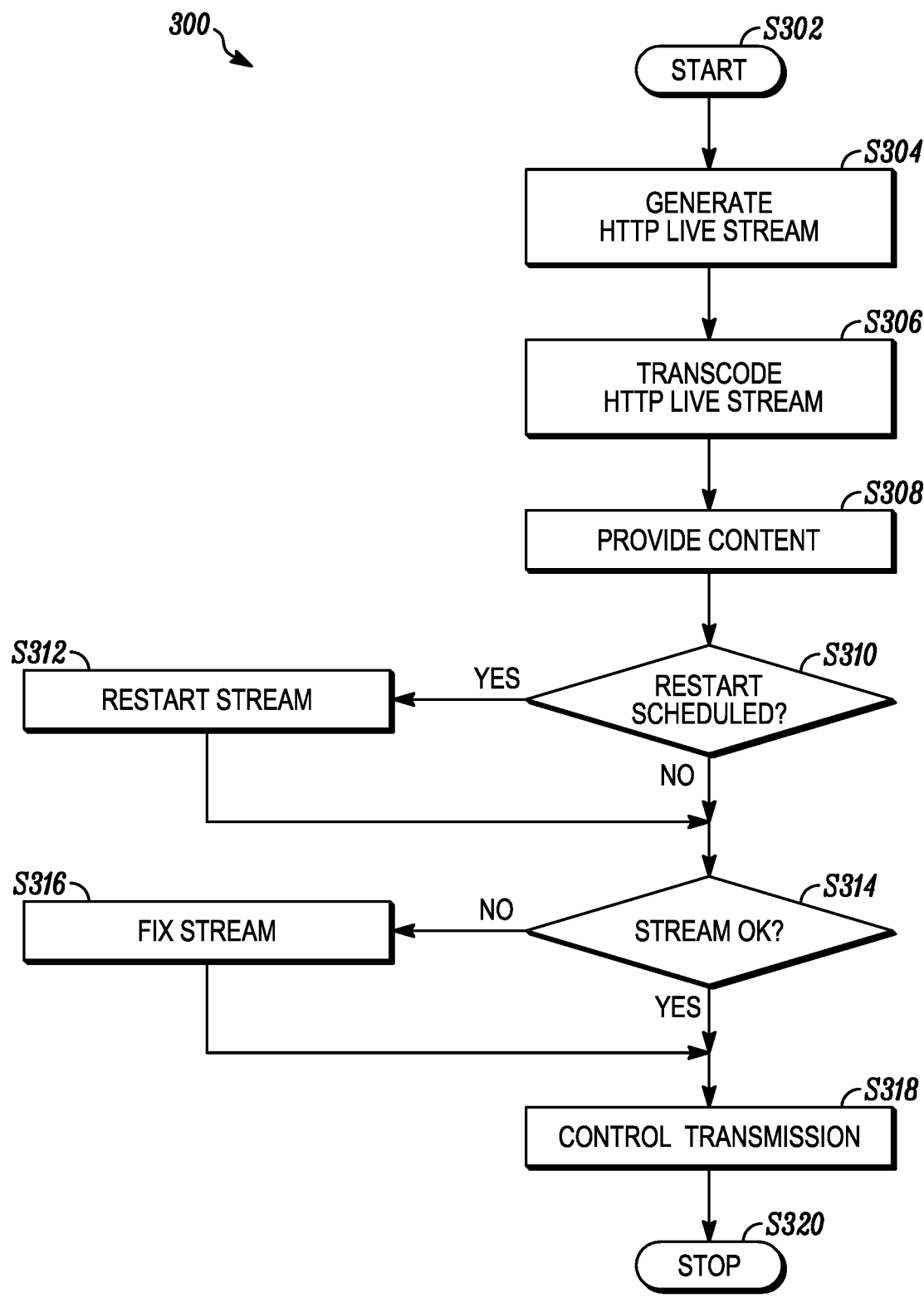
FIG. 3 illustrates a method of operating the MVPD stream controller system of FIG. 2 in accordance with aspects of the present disclosure.

FIG. 3 illustrates a method 300 of operating MVPD stream controller system 200 of FIG. 2 in accordance with aspects of the present disclosure.

As shown in FIG. 3, method 300 starts (S302) and an HLS is generated (S304). In an example embodiment, MVPD controller 202 initiates the generation of the HLS.

For example, returning to FIG. 2, MVPD stream controller component 218 may be any device or system that is operable to manage the plurality of conversion engines 210 and manage distribution network 206. As will be described in greater detail below, MVPD stream controller component 218 additionally provides the following functions. MVPD stream controller component 218: manages each of the plurality of conversion engines 210 that are used to execute HTML5 Code and ABR manifests that convert ABR streams to MPEG transport streams; provides configuration of each of the plurality of conversion engines 210; provides configuration of HTML code type designations, e.g., Dev, Test, Production; provides an operational GUI to manage and monitor the generated conversion streams; stores active configuration for the each of the plurality of conversion engines 210, the generated conversion streams and logs changes; provides communications path to each conversion instance for configuration updates, state change notices and to send control commands to running rendering instances; provides life-cycle control of the conversion streams (Startup, Rendering, Idle, Stopped, Change, Restart); provides health monitoring of the plurality of conversion engines 210 and raises alarms, logs events and initiates restarts as needed; provides graceful and scheduled restarts of the conversion streams, wherein it gracefully idles a conversion stream and then restarts the conversion stream, and wherein restarts are required because many HTML 5 and video players may memory leak over time; and optionally updates the configuration of transcoder 240, post processing component 242 and network 244 to meet MVPD specified ingest formats.

For purposes of discussion, again, let the desired ABR linear stream correspond to a popular sports website. In other words, MVPD stream providing system 200 will transform and ABR linear stream of data from the website to an MPEG TS so that end users may view it on a television or set top box.

Further, in this example, each of the plurality of conversion engines 210 is ready for configuration. In this example, conversion engine 236 will be used to generate an MPEG TS from an HLS of data from the popular sports website. However, it should be known that MVPD stream providing system 200 is able to configure, monitor and control a plurality of conversion engines in order to provide a plurality of independent MPEG transport streams from a plurality of different ABR linear streams of data.

Services component 220 may be any device or system that is operable to: control DCT component 222, GUI 224, life-cycle manager 226, scheduled restart controller 228, conversion instance communications channel manager 230, stream monitor 232 and thread manager 234; configure each of the plurality of conversion engines 210; and configure transcoder 240, post processing component 242 and network 244.

Outbound IP address inventory system 214 may be any device or system that is operable to store a plurality of outbound IP addresses that are associated with potential MVPD network input components that will ultimately provide the MPEG transport streams to end user devices.

Initially, services component 220 determines the desired outbound IP addresses from outbound IP address inventory system 214. The desired outbound IP addresses are for the potential MVPD network input components, such as MVPD network input components 246 and 248, that will ultimately provide the MPEG transport streams to end user devices.

CENE inventory system 216 may be any device or system that is operable to store information for formatting a conversion engine, for configuring transcoder 240 and for configuring post processing component 242 to provide a desired MPEG TS from a desired type of ABR source content to a desired MVPD network input component.

Services component 220 determines the information for configuring a conversion engine, for configuring transcoder 240 and for formatting post processing component 242 to provide the desired MPEG TS from the desired type of ABR source content to the desired a desired MVPD network input component from CENE inventory system 216. The desired outbound IP addresses are for the destination a desired MVPD network input components.

Thread manager 234 may be any device or system that is operable to establish communication paths between MVPD stream controller component 218 the plurality of conversion engines 210.

Services component 220 instructs thread manager to establish a communication path between MVPD stream controller component 218 and conversion engine 236. Services component 220 additionally instructs life-cycle manager 226 to instruct, via the newly established communication path, conversion engine 236 to start a new MPEG TS. The instruction will include the desired type of ABR source content and the desired outbound IP addresses as obtained from outbound IP address inventory system 214. The instruction will additionally include the information for configuring conversion engine 236, for configuring transcoder 240 and for configuring post processing component 242 as obtained from CENE inventory system 216.

DCT component 222 may be any device or system that is operable to store and manage information related to streams created by the plurality of conversion engines 210.

Services component 220 stores information into DCT component 222. In particular, services component 220 stores, into DCT component 222: the desired type of ABR source content and the desired outbound IP addresses as obtained from outbound IP address inventory system 214 for the stream that is to be created; the information for configuring conversion engine 236, for configuring transcoder 240 and for configuring post processing component 242 as obtained from CENE inventory system 216; the information of the newly created communication path with conversion engine 236; and the information identifying conversion engine 236 of the plurality of conversion engines 210 as the conversion engine 236 that is responsible for generating the desired MPEG TS.

Conversion instance communications channel manager 230 may be any device or system that is operable to create and maintain an inband communication channel to a respective conversion engine after the respective conversion engine has started sending an MPEG TS. In this manner, services component 220 is able to send commands directly to the respective conversion engine. For example, services component 220 may instruct a specific conversion engine to stop playing a stream and start playing a new stream. Further, in some cases a website might requires some sort of interaction, e.g., clicking on a GUI "PLAY" button. The inband communication channel maintained by conversion instance communications channel manager 230 enables such interaction, such that services component 220 is able to send commands into the ABR playback session as a user would.

Stream monitor 232 may be any device or system that is operable to monitor each generated MPEG TS.

Services component 220 instructs stream monitor 232 to start monitoring the MPEG TS that will be generated by conversion engine 236.

Life-cycle manager 226 may be any device or system that is operable to start and to stop creation of MPEG TS by the plurality of conversion engines 210. Life-cycle manager 226 instructs 236 to start an MPEG TS.

In operation, after conversion engine 236 receives the instruction, from life-cycle manager 226, to start a new MPEG TS, conversion engine 236 sends token 124 to ABR stream manifest provider 102 requesting a manifest for a desired ABR linear stream.

After receiving token 124, ABR stream manifest provider 102 accesses content decisioning component 108 and ABR source content component 110. ABR stream manifest provider 102 then accesses content decisioning component 108 and ABR source content component 110.

Token 124 identifies the sought after ABR source content and arrangement defined by the content decisions. ABR stream manifest provider 102 obtains the requested content decisions from content decisioning component 108 and the information of the ABR source content from ABR source content component 110 and assembles an ABR linear stream manifest 126, which indicates the order in which the ABR source content assets should be arranged in the ABR linear stream.

ABR stream manifest provider 102 then provides ABR linear stream manifest 126 to conversion engine 236.

HTML5 code repository 204 may be any device or system that is operable to store and manage HTML5 code required to assemble the ABR content into a linear stream as indicated in ABR stream manifest 126. HTML5 code repository 204 is similar to HTML5 code component 112 discussed above with reference to FIG. 1. However, in MVPD stream providing system 200, the plurality of conversion engines 210 share access to the HTML5 code stored in HTML5 code repository 204.

A conversion engine, of the plurality of conversion engines 210, operates in a manner similar to conversion engine 104 discussed above with reference to FIG. 1. A conversion engine, of the plurality of conversion engines 210, differs from conversion engine 104 in that a conversion engine, of the plurality of conversion engines 210, is operable to be configured and controlled by MVPD stream controller component 218, and is operable to obtain HTML5 code from HTML5 code repository 204 in accordance with instructions from MVPD stream controller component 218.

Returning to FIG. 3, after the HTTP live stream is generated (S304), the HTTP live stream is transcoded (S306). In an example embodiment, a conversion engine transcodes the HLS to an MPEG TS.

For example, returning to FIG. 2, conversion engine 236 additionally obtains ABR source content 128 from ABR source content component 110 and obtains HTML5 code from HTML5 code repository 204 and assembles an HTTP live stream (HLS) in accordance with ABR linear stream manifest 126.

Finally, conversion engine 236 converts the HLS into and MPEG TS. During the conversion, conversion engine 236 may perform many operations, non-limiting examples of which include decryption, demultiplexing, transcoding and remultiplexing.

Returning to FIG. 3, after the HTTP live stream is transcoded (S306), content is provided (S308). In an example embodiment, distribution network 206 provides the MPEG TS to the end user's device (not shown).

For example, returning to FIG. 2, the MPEG TS generated by conversion engine 236 is provided to distribution network 206, to ultimately distribute the MPEG TS to an end user's device (not shown). In particular, IP multicast network 114 determines whether the MPEG TS should be transcoded or groomed.

If the MPEG TS should be transcoded, IP multicast network 114 provides the MPEG TS to transcoder 240 to be transcoded. For example, transcoder 240 might change the frame rate, resolution and/or the video codec of the MPEG TS.

If the MPEG TS should be groomed, IP multicast network 114 provides the MPEG TS to post processing component 242. For example, MPEG TS post processing component 243 may groom the MPEG TS to improve performance. Such grooming may take the form of SPTS/MPTS grooming, rate shaping, performing stream redundancy or providing a slate.

With respect to performing stream redundancy, in some cases, conversion engine 236 might generate a plurality of redundant MPEG transport streams. In the event that one stream fails, post processing component 118 might switch to one of the provided redundant streams. In the event all redundant MPEG transport streams fails, post processing component 242 may provide a slate, e.g., a stock video or image to be provided to the end user's television or set to box that indicates that there is a problem, but "We'll Be Right Back."

It should be noted that any transcoded MPEG TS from transcoder 240 will also pass through post processing component 242 for post processing, if needed.

If the MPEG TS from IP multicast network 114 does not need to be transcoded and/or groomed, IP multicast network 114 sends the MPEG TS to network 244. Otherwise, post processing component 242 sends the processed MPEG TS to network 244. At that point, network 244 may provide the MPEG TS to MVPD network input component 246 for distribution to the end user's device. Network 244 may provide the MPEG TS to MVPD network input component 246 by way of direct point-to-point fiber or IP connection and/or a secure tunnel over the Internet.

Returning to FIG. 3, after content is provided (S308), it is determined whether a restart is scheduled (S310). In an example embodiment, scheduled restart controller 228 determines whether a restart is scheduled.

For example, returning to FIG. 2, scheduled restart controller 228 may be any device or system that is operable to manage a restart of conversion engine.

There may be situations where a conversion engine should be stopped and restarted, a non-limiting example of which includes correction for a known memory leak over time. For this reason, services component 220 may instruct scheduled restart controller 228 to stop a conversion engine at a predetermined time, or after a predetermined event, and then restart the conversion engine. Scheduled restart controller may then detect when the predetermined time arrives, e.g., after 24 hours, or the predetermined event occurs, e.g., a detected memory leak reaches a predetermined threshold.

Returning to FIG. 3, if it is determined that a restart is scheduled (Y at S310), then a stream is restarted (S312). In an example embodiment, scheduled restart controller 228 has detected that the predetermined time has arrived or the predetermined event has occurred and thus restarts a conversion engine.

For example, returning to FIG. 2, consider the case where conversion engine 236 is scheduled to be restarted after 24 hours of operation. After 24 hours of operation, scheduled restart controller 228 may instruct conversion engine 236, via the thread provided by threads manager 234, to "gracefully" stop. A graceful stop permits the conversion engine to stop generating an MPEG TS at a specified break point, e.g., between one content and another, such as at the end of a movie or advertisement. This is to be contrasted with a hard stop, which would stop an MPEG TS immediately. Scheduled restart controller 228 may then follow up with an instruction to conversion engine 236, via the thread provided by threads manager 234, to restart.

Returning to FIG. 3, after a stream is restarted (S312), or if it is determined that a restart is not scheduled (N at S310), it is determined whether a stream is operating properly (S314). In an example embodiment, as mentioned above and illustrated in FIG. 2, stream monitor 232 monitors the conversion engines to determine proper functioning.

Consider the situation where conversion engine 236 is malfunctioning or all together stops generating the MPEG TS. Stream monitor 232 will detect such malfunctioning or stoppage and instruct scheduled restart controller 228 to restart conversion engine 236.

Returning to FIG. 3, if it is determined that a stream is not operating properly (N at S314), then a stream is corrected (S316). In an example embodiment, scheduled restart controller 228 instructs the conversion engine to restart. In another example embodiment, services component starts a new conversion engine to provide the MPEG TS.

For example, returning to FIG. 2, in the case where conversion engine 236 is merely malfunctioning, scheduled restart controller 228 may instruct conversion engine 236, via the thread provided by treads manager 234, to gracefully top. Scheduled restart controller 228 may then follow up with an instruction to conversion engine 236, via the thread provided by threads manager 234, to restart. Such stop/restart instructions may be provided a predetermined number of times in order to correct the malfunction of conversion engine 236. If stream monitor 232 determines that conversion engine 236 fails to properly operate after the predetermined number of restarts, stream monitor 232 may inform services component 220 of the malfunction. At that point, services component 220 may initiate a new conversion engine of plurality of the conversion engines 210 to generate the MPEG TS that was previously generated by conversion engine 236.

Further, at this point, alarm 212 may indicate the problem of conversion engine 236. Alarm 212 may be any device or system that is operable to provide notification of the status of any one of the plurality of conversion engines 210. Non-limiting examples of types of notification includes current status or errors. Notification may take the form of an image, a sound or combination thereof. Further, alarm 212 may transmit the notification to a remote receiver by any known method.

Returning to FIG. 3, after a stream is corrected (S316), or if it is determined that a stream is operating properly (Y at S314), then transmission is controlled (S318). In an example embodiment, services component 220 modifies transmission as needed.

For example, returning to FIG. 2, services component 220 may send direct instructions to transcoder 240 so as to modify at least one of the frame rate, resolution and/or video codec. Otherwise, transcoder 240 functions in a manner similar to transcoder 116 discussed above with reference to FIG. 1.

Further, services component 220 may send direct instructions to post processing component 242 so as to modify at least one of SPTS/MPTS grooming, rate shaping, stream redundancy or slate providing. Otherwise, post processing component 242 functions in a manner similar to post processing component 118 discussed above with reference to FIG. 1.

Still further, services component 220 may send direct instructions to network 244 to direct the MPEG TS to a newly identified MVPD network input component. Otherwise, network 244 functions in a manner similar to network 120 discussed above with reference to FIG. 1.

Returning to FIG. 3, after transmission is controlled (S318), method 300 stops (S320).

It should be noted that 218 may be operated by a user by way of GUI 224. GUI 224 may be any device or system that is operable to enable a user to access and MVPD stream controller component 218. GUI 224 may include one or more layers including a human-machine interface (HMI) machines with physical input hardware such a keyboards, mice, game pads and output hardware such as computer monitors, speakers, and printers. Additional UI layers in GUI 224 may interact with one or more human senses, including: tactile UI (touch), visual UI (sight), and auditory UI (sound).

MVPD stream providing system 200 was simulated, and the results are presented in FIGS. 4A-4D.

FIG. 4A illustrates a graph 400 having a y-axis 402 of percentage of memory usage of a MVPD converter and an x-axis 404 of time. A function 406 indicates the memory usage over time.

FIG. 4B illustrates a graph 408 having a y-axis 410 of percentage of memory usage of a client device and an x-axis 412 of time. A function 414 indicates the memory usage over time. As can be seen by comparing function 406 of FIG. 4A with function 414 of FIG. 4B, the memory resources used by the MVPD converter during creation of the MPEG TS and the memory resources of the client device when decoding the MPEG TS are aligned.

Figure 4C:
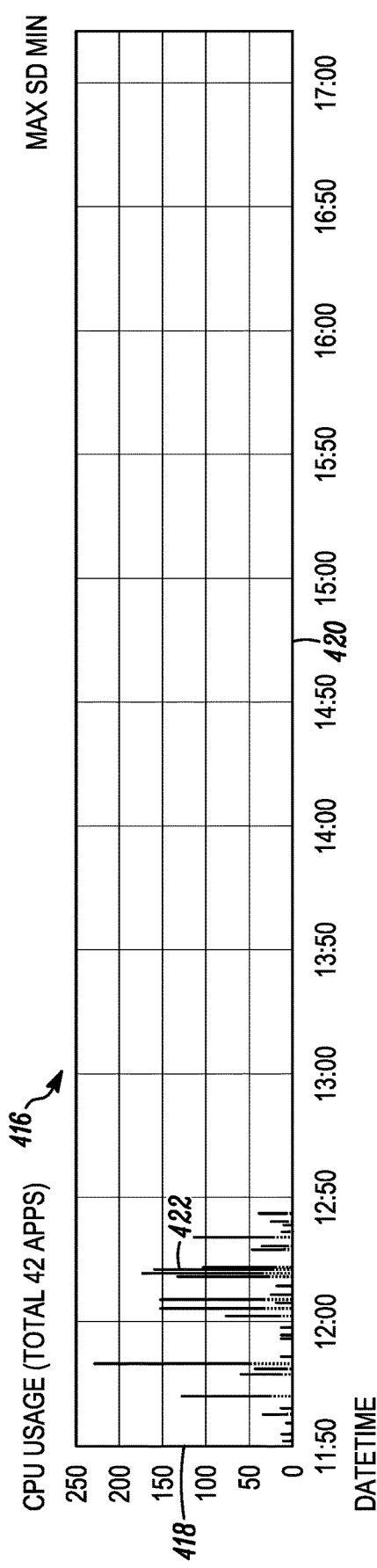
FIG. 4C illustrates a graph of the number of applications in processor usage of a MVPD converter as a function of time.

FIG. 4C illustrates a graph 416 having a y-axis 418 of the number of applications in processor usage of a MVPD converter and an x-axis 420 of time. A function 422 indicates that initially the processor resources spike, but they subsequently level out.

Figure 4D:
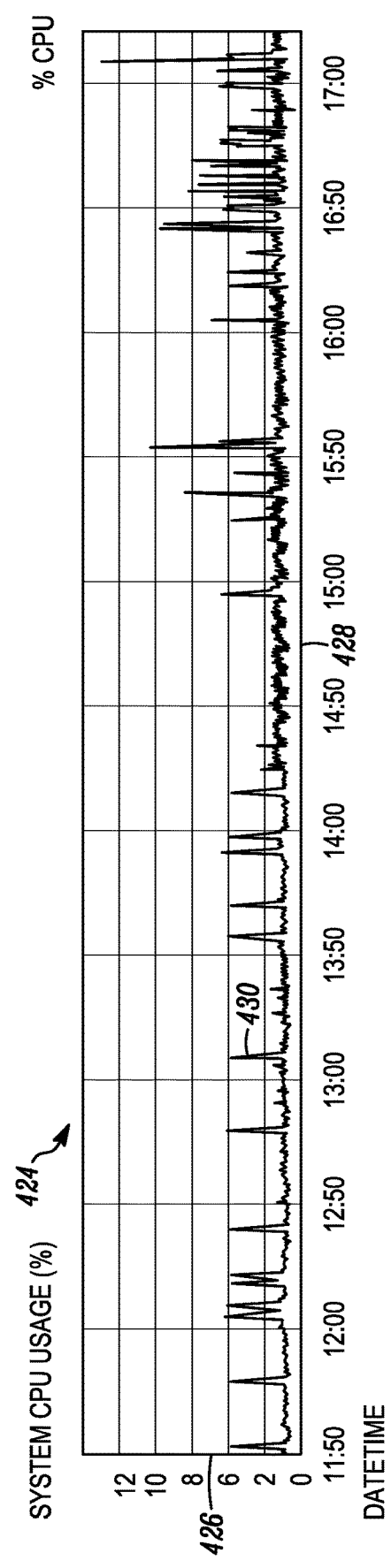
FIG. 4D illustrates a graph of percentage of processor usage of a client device as a function of time.

FIG. 4D illustrates a graph 424 having a y-axis 426 of percentage of processor usage of a client device and an x-axis 428 of time. A function 430 indicates the memory usage over time. Comparing the functions of FIGS. 4C and 4D, it is clear that MVPD converter uses more resources to start up a stream as evidenced by FIG. 4C, whereas a client device requires more constant resources to keep rendering the MPEG TS.

A prior art MVPD system, as discussed above with reference to FIG. 1, is created to convert a specific ABR content to an MPEG TS for delivery to a specific MVPD network input component. On the contrary, a MVPD stream providing system in accordance with aspects of the present enables the configuration, controlling, managing and monitoring of a plurality of distinct ABR linear stream-MPEG conversion stream sessions. The MVPD stream providing system in accordance with aspects of the present disclosure supports independent and distinct start, stop, restart and status operations of each of the plurality of distinct sessions. It also constantly monitors every one the streaming sessions and restarts them as needed.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A multichannel video programming distributor controller for use with an adaptive bitrate stream provider, a HTML code repository and a plurality of conversion engines, the adaptive bitrate stream provider being operable to provide a plurality of adaptive bitrate streams of content data, the HTML code repository being operable to provide HTML code, each of the plurality of conversion engines being operable to obtain a respective adaptive bitrate stream from the adaptive bitrate stream provider, to obtain the HTML code from the HTML code repository and output a respective MPEG transport stream, said multichannel video programming distributor controller comprising:
an outbound IP address inventory system having a plurality of outbound IP addresses stored therein;
a conversion engine and network elements inventory system having stored therein, a plurality of ABR identification data associated with the respective plurality of adaptive bitrate streams of content data and HTML identification data associated with the HTML code; and
an MVPD stream controller,
wherein said MVPD stream controller is operable to provide a stream instruction, based on one of the plurality of outbound IP addresses, one of the plurality of ABR identification data and the HTML identification data so as to instruct one of the plurality of conversion engines to output a first MPEG transport stream.

2. The multichannel video programming distributor controller of claim 1, wherein said MVPD stream controller is further operable to generate a second stream instruction based on a second one of the plurality of outbound IP addresses, a second one of the plurality of ABR identification data and the HTML identification data so as to instruct a second one of the plurality of conversion engines to output a second MPEG transport stream.

3. The multichannel video programming distributor controller of claim 2, wherein said MVPD stream controller comprises a life-cycle manager operable to generate a start stream instruction and to generate a stop stream instruction, the start stream instruction being operable to instruct the one of the plurality of conversion engines to start outputting of the MPEG transport stream, the stop stream instruction being operable to instruct the one of the plurality of conversion engines to stop outputting of the MPEG transport stream based on the stop stream instruction.

4. The multichannel video programming distributor controller of claim 3, wherein said MVPD stream controller further comprises a scheduled restart controller operable to generate a restart instruction that is operable to instruct the conversion engine to restart outputting of a stopped MPEG transport stream.

5. The multichannel video programming distributor controller of claim 4, wherein said MVPD stream controller further comprises an alarm operable to provide notification of a status of any one of the plurality of conversion engines.

6. The multichannel video programming distributor controller of claim 1, wherein said MVPD stream controller comprises a life-cycle manager operable to generate a start stream instruction and to generate a stop stream instruction, the start stream instruction being operable to instruct the one of the plurality of conversion engines to start outputting of the MPEG transport stream, the stop stream instruction being operable to instruct the one of the plurality of conversion engines to stop outputting of the MPEG transport stream based on the stop stream instruction.

7. The multichannel video programming distributor controller of claim 6, wherein said MVPD stream controller further comprises a scheduled restart controller operable to generate a restart instruction that is operable to instruct the conversion engine to restart outputting of a stopped MPEG transport stream.

8. A method comprising:
providing, via an adaptive bitrate stream provider, a plurality of adaptive bitrate streams of content data;
providing, via a HTML code repository, HTML code:
storing, in an outbound IP address inventory system, a plurality of outbound IP addresses;
storing, in a conversion engine and network elements inventory system, a plurality of ABR identification data associated with the respective plurality of adaptive bitrate streams of content data and HTML identification data associated with the respective plurality of sets of HTML code;
generating, via an MVPD stream controller, generate a stream instruction based on one of the plurality of outbound IP addresses, one of the plurality of ABR identification data and the HTML identification data; and outputting, via one of a plurality of conversion engines, an MPEG transport stream based on the stream instruction.

9. The method of claim 8, further comprising:
generating, via the MVPD stream controller, a second stream instruction based on a second one of the plurality of outbound IP addresses, a second one of the plurality of ABR identification data and the HTML identification data; and
outputting, via a second one of the plurality of conversion engines, a second MPEG transport stream based on the second stream instruction.

10. The method of claim 9, further comprising:
generating, via a life-cycle manager of the MVPD stream controller, a start stream instruction and to generate a stop stream instruction;
starting, via the one of the plurality of conversion engines, of the outputting of the MPEG transport stream based on the start stream instruction;
generating, via a life-cycle manager of the MVPD stream controller, a stop stream instruction; and
stopping, via the one of the plurality of conversion engines, of the outputting of the MPEG transport stream based on the stop stream instruction.

11. The method of claim 10, further comprising:
generating, via a scheduled restart controller of the MVPD stream controller, a restart instruction; and
restarting, via the one of the plurality of conversion engines, of the outputting of a stopped MPEG transport stream based on the restart instruction.

12. The method of claim 8, further comprising providing, via an alarm, notification of a status of any one of the plurality of conversion engines.

13. The method of claim 8, further comprising:
generating, via a life-cycle manager of the MVPD stream controller, a start stream instruction and to generate a stop stream instruction;
starting, via the one of the plurality of conversion engines, of the outputting of the MPEG transport stream based on the start stream instruction;
generating, via a life-cycle manager of the MVPD stream controller, a stop stream instruction; and
stopping, via the one of the plurality of conversion engines, of the outputting of the MPEG transport stream based on the stop stream instruction.

14. The method of claim 13, further comprising:
generating, via a scheduled restart controller of the MVPD stream controller, a restart instruction; and
restarting, via the one of the plurality of conversion engines, of the outputting of a stopped MPEG transport stream based on the restart instruction.

15. A non-transitory, tangible, computer-readable media having computer-readable instructions stored thereon, the computer-readable instructions being capable of being read by a computer and being capable of instructing the computer to perform the method comprising:
providing, via an adaptive bitrate stream provider, a plurality of adaptive bitrate streams of content data;
providing, via a HTML code repository, HTML code:
storing, in an outbound IP address inventory system, a plurality of outbound IP addresses;
storing, in a conversion engine and network elements inventory system, a plurality of ABR identification data associated with the respective plurality of adaptive bitrate streams of content data and HTML identification data associated with the HTML code;
generating, via an MVPD stream controller, generate a stream instruction based on one of the plurality of outbound IP addresses, one of the plurality of ABR identification data and the HTML identification data; and
outputting, via one of a plurality of conversion engines, an MPEG transport stream based on the stream instruction.

16. The non-transitory, tangible, computer-readable media of claim 15, the computer-readable instructions being capable of instructing the computer to perform the method further comprising:
generating, via the MVPD stream controller, a second stream instruction based on a second one of the plurality of outbound IP addresses, a second one of the plurality of ABR identification data and the HTML identification data; and
outputting, via a second one of the plurality of conversion engines, a second MPEG transport stream based on the second stream instruction.

17. The non-transitory, tangible, computer-readable media of claim 16, the computer-readable instructions being capable of instructing the computer to perform the method further comprising:
generating, via a life-cycle manager of the MVPD stream controller, a start stream instruction and to generate a stop stream instruction;
starting, via the one of the plurality of conversion engines, of the outputting of the MPEG transport stream based on the start stream instruction;
generating, via a life-cycle manager of the MVPD stream controller, a stop stream instruction; and
stopping, via the one of the plurality of conversion engines, of the outputting of the MPEG transport stream based on the stop stream instruction.

18. The non-transitory, tangible, computer-readable media of claim 17, the computer-readable instructions being capable of instructing the computer to perform the method further comprising:
generating, via a scheduled restart controller of the MVPD stream controller, a restart instruction; and
restarting, via the one of the plurality of conversion engines, of the outputting of a stopped MPEG transport stream based on the restart instruction.

19. The non-transitory, tangible, computer-readable media of claim 15, the computer-readable instructions being capable of instructing the computer to perform the method further comprising:
generating, via a life-cycle manager of the MVPD stream controller, a start stream instruction and to generate a stop stream instruction;
starting, via the one of the plurality of conversion engines, of the outputting of the MPEG transport stream based on the start stream instruction;
generating, via a life-cycle manager of the MVPD stream controller, a stop stream instruction; and
stopping, via the one of the plurality of conversion engines, of the outputting of the MPEG transport stream based on the stop stream instruction.

20. The non-transitory, tangible, computer-readable media of claim 19, the computer-readable instructions being capable of instructing the computer to perform the method further comprising:
generating, via a scheduled restart controller of the MVPD stream controller, a restart instruction; and restarting, via the one of the plurality of conversion engines, of the outputting of a stopped MPEG transport stream based on the restart instruction.

\* \* \* \* \*